S. B. HESS.
BATTERY ARRANGEMENT.
APPLICATION FILED MAY 4, 1916.
1,306,147.
Patented June 10, 1919.
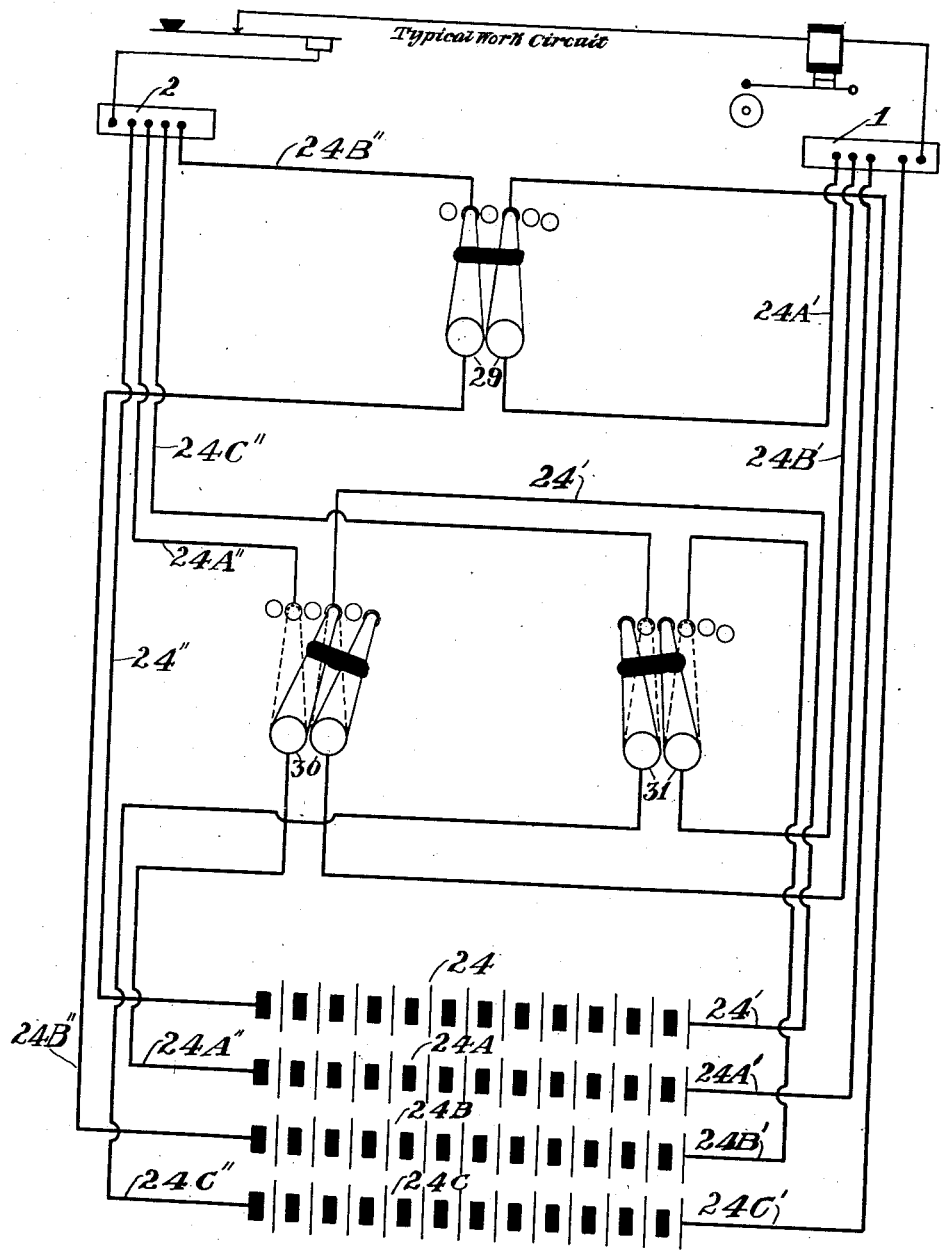
WITNESSES:
Frank W. White
Minnie Newman
INVENTOR
Simon B. Hess

UNITED STATES PATENT OFFICE.

SIMON B. HESS, OF NEW YORK, N. Y.

BATTERY ARRANGEMENT.

1,306,147.  Specification of Letters Patent.  Patented June 10, 1919.

Original application filed December 26, 1914, Serial No. 879,049. Divided and this application filed May 4, 1916. Serial No. 95,367.

*To all whom it may concern:*

Be it known that I, SIMON B. HESS, a citizen of the United States, residing at New York, in the county of New York and State of New York, have invented certain new and useful Improvements in Battery Arrangements, of which the following is a specification.

This application is a division of my application Serial No. 879,049, filed December 26, 1914, patented June 27, 1916, No. 1,188,654.

This invention aims to provide a method of supplying battery current to a protective or other electric system with great convenience, efficiency and economy of installation and maintenance.

Up to the present time, although attempts have been made to use dry cells, the most efficient battery systems have been equipped with other and much more expensive types of primary batteries, of large ampere hour capacity.

One of the objects of this invention is to provide a battery system by means of which large ampere hour capacity may be obtained while using dry cells.

A further object of this invention is to provide a battery system with means for changing at will and at any time the E. M. F. thereof without changing and in particular without adding to the original battery installation.

A further object of this invention is to provide means whereby fresh cells may be substituted for exhausted ones without disturbing the working circuit, and when the said battery system gives out entirely or becomes no longer possible of manipulation adequately to increase the E. M. F. anyone not acquainted with the art will be enabled readily to replace old with the necessary new battery cells again to make the system operative.

Other objects and aims of this invention more or less broad than those stated above, together with the advantages inherent, will be in part obvious and in part specifically referred to in the course of the following description of the elements, combinations, arrangements of parts, and applications of principles constituting this invention; and the scope of protection contemplated will appear from the claims.

The accompanying drawing which is to be taken as a part of said specification and wherein I have shown an embodiment of the invention as at present preferred, is a generally diagrammatic view disclosing said embodiment.

Referring now particularly to the parts and combinations of parts shown by this drawing, the reference numerals 1 and 2 represent a feeding bus-bar and a return bus-bar, respectively. The switches 29, 30 and 31 are provided as a portion of the feature of my invention adapted to permit using a battery installation as a source of current for the working circuit. This source here consists of four banks, 24, $24^A$, $24^B$, and $24^C$, of cells, each bank having its cells arranged in series; so that, there being shown 12 cells in each bank, if each cell is assumed to deliver current at two volts, an E. M. F. of twenty-four volts may be taken from each bank: hence the selection of the reference numerals just above mentioned and the application of the reference numerals $24'$, $24''$, $24^{A'}$, $24^{A''}$, $24^{B'}$, $24^{B''}$, $24^{C'}$ and $24^{C''}$ to the various conductors associated with said banks, with the switches 29, 30 and 31 and with the bus-bars 1 and 2. If the generally accepted one and one-half volt dry cells be used, and it is still desired to have each bank deliver twenty-four volts, of course sixteen cells will be included in series in each bank.

Let us now consider the various possible manipulations of switches 29, 30 and 31 to deliver any desired voltage,—of course it being understood that there may be employed as many banks, and as many cells in each bank, and as many combinations and subcombinations of such switches, and obviously as many battery conductors, as desired.

Say all three switches 29, 30 and 31 are set as shown in full lines; then the two banks 24 and $24^A$ are in series, conductor $24^{A'}$ leading current to bus-bar 1 and conductor $24''$ leading current from bus-bar 2 back to the battery. Conductor $24^{B'}$ from bank $24^B$ and conductor $24^{C''}$ from bank $24^C$ are open at switch 31, and forty-eight volts is available at the bus-bars 1 and 2.

Say switches 30 and 31 are shifted to their broken-line positions; then all four banks will be in parallel, conductors $24'$, $24^{A'}$, $24^{B'}$ and $24^{C'}$ all leading current to bus-bar 1, and conductors $24''$, $24^{A''}$, $24^{B''}$ and $24^{C''}$ all leading current from bus-bar 2 back to the battery, and twenty-four volts will be available at the bus-bars 1 and 2. Say only the switch 30 is shifted to its broken-line position; then banks 24 and 24$^A$ will be in parallel, conductors 24′ and 24$^{A\prime}$ leading current to bus-bar 1, and conductors 24″ and 24$^{A\prime\prime}$ leading current from bus-bar 2 back to the battery, and now also twenty-four volts will be available at bus-bars 1 and 2, banks 24$^B$ and 24$^C$ being unused. Say switch 31 is shifted to its broken-line position and switch 30 is shifted to an open-circuit position; then banks 24$^B$ and 24$^C$ will be in parallel, conductors 24$^{B\prime}$ and 24$^{C\prime}$ leading current to bus-bar 1, and conductors 24$^{B\prime\prime}$ and 24$^{C\prime\prime}$ leading current from bus-bar 2 back to the battery, and now also twenty-four volts will be available at bus-bars 1 and 2, banks 24 and 24$^A$ being unused.

It will be seen that in all three cases immediately foregoing twenty-four volts will be available, and that consequently when any of the said banks is accidentally or otherwise not functioning or is running low, the presence of such switches gives insurance that by their proper manipulation twenty-four volts, if that be the E. M. F. desired, may always be obtained.

Say only switch 31 is shifted to its extreme right hand position; then banks 24 and 24$^A$ are in series and banks 24$^B$ and 24$^C$ are in series, each of these sets of banks being in parallel with each other, conductors 24$^{A\prime}$ and 24$^{C\prime}$ both leading current to bus-bar 1, and conductors 24″ and 24$^{B\prime\prime}$ both leading current from bus-bar 2 back to the battery, and now forty-eight volts will be available at bus-bars 1 and 2. Say switch 31 is shifted to its extreme right hand position and switch 30 is shifted to an open-circuit position; then banks 24$^B$ and 24$^C$ are in series, conductor 24$^{C\prime}$ leading current to bus-bar 1, and conductor 24$^{B\prime\prime}$ leading current from bus-bar 2 back to the battery. Conductor 24′ from bank 24 and conductor 24$^{A\prime\prime}$ from bank 24$^A$ are open at switch 30 and forty-eight volts is available at bus-bars 1 and 2.

It will be seen that in the first case described, and in the last two cases immediately foregoing forty-eight volts will be available, and that consequently when any of the said banks is accidentally or otherwise non-functioning or is running low, the presence of such switches gives insurance that by their proper manipulation forty-eight volts, if that be the E. M. F. desired, may always be obtained.

It will also be seen that if it is desired to have seventy-two volts available at bus-bars 1 and 2, one or the other or both of the switches 30 and 31 may be equipped with the usual detachable yoke, so that the separate arms of the switch may be so moved that the circuit of bank 24 or 24$^C$ may be open while the other three banks are connected in series.

And finally (remembering that the word "finally" is thus used merely in connection with the present embodiment), say that both switches 29 and 31 are shifted to their extreme right hand positions, then all four banks will be in series, only the conductor 24$^{C\prime}$ leading current to bus-bar 1 and conductor 24″ leading current from bus-bar 2 back to the battery, as will be easily understood from the drawing by following the conductor 24′ as it leaves bank 24, and now ninety-six volts will be available at bus-bars 1 and 2.

As is well known, dry cells are worked to the best advantage when occasionally allowed to remain on open circuit (the contemplation of which is present, as will be apparent from an examination of the drawing); and so attention is directed to the fact that means are provided for alternately working and resting various banks of cells without disturbing the normal condition of the circuit, as, for example, by working and alternately resting two banks in series.

When it is found necessary for the efficient operation of the system to use the battery with the switches in the higher voltage positions, this will indicate to the unskilled attendant the necessity of being prepared with new cells to replace the old, to the end that he may have such cells on hand before the system actually becomes incapable of operation because of a drop of E. M. F. or the complete exhaustion of the source of energy.

Switches 30 and 31 are shown in the drawing as being individually operable. It is obviously apparent that should it be found desirable for any cause simultaneously to open and close the circuits controlled by said switches, a single bridge of suitable material may be employed for connecting the switches or certain of the switches and synchronizing the motion of the contacts thereof.

What I claim and desire to secure by Letters Patent of the United States is:

1. In a system of the class described, in combination, a work circuit, and means for furnishing current thereto, said means including a predetermined number of sources of energy, and one less number of four-contact switches, each switch having two contacts connected to opposite terminals of the work circuit, and the other two contacts connected to opposite terminals of two of said sources of energy.

2. In a system of the class described, in combination, a work circuit, and means for furnishing current thereto, said means including four sources of energy, and three four-contact switches, each switch having two contacts connected to opposite terminals of the work circuit, and the other two contacts connected to opposite terminals of two of said sources of energy.

3. In a system of the class described, in combination, a work circuit, and means for furnishing current thereto, said means including a predetermined plurality of individual sources and manually adjustable instrumentalities for at will arranging said sources in series or in parallel; said instrumentalities including a plurality of four-contact switches, the number of said switches being one less than the number of said sources.

4. In a system of the class described, in combination, a work circuit, and means for furnishing current thereto, said means including a predetermined plurality of individual sources and manually adjustable instrumentalities for at will arranging said sources in series or in parallel; said instrumentalities including a plurality of four-contact switches, each of said switches having associated therewith four conductors, as follows, to wit: a first conductor leading from one of said sources to one of said contacts, a second conductor leading from another of said contacts to said circuit, a third conductor leading from another of said sources to still another of said contacts, and a fourth conductor leading from said circuit back to still another of said contacts.

5. In a system of the class described, in combination, a work circuit, and means for furnishing current thereto, said means including a predetermined plurality of individual sources and manually adjustable instrumentalities for at will arranging said sources in series or in parallel, and certain of said sources on open circuit, said instrumentalities including a plurality of four-contact switches, each of said switches having associated therewith four conductors as follows, to wit: a first conductor leading from one of said sources to one of said contacts, a second conductor leading from another of said contacts to said circuit, a third conductor leading from another of said sources to still another of said contacts, and a fourth conductor leading from said circuit back to still another of said contacts, one or more of said switches being adapted in one adjustment to bridge the first mentioned contact and the second mentioned contact and to bridge the third mentioned contact and the fourth mentioned contact, and adapted in another adjustment to bridge the first mentioned contact and the third mentioned contact.

In witness whereof, I have hereunto subscribed my name this 2nd day of May, A. D. 1916.

SIMON B. HESS.

Witnesses:
CLARK POOL,
BELLE HAMMER.